(12) United States Patent
Guo et al.

(10) Patent No.: US 8,509,163 B2
(45) Date of Patent: Aug. 13, 2013

(54) METHOD AND SYSTEM FOR SELECTING NETWORK EQUIPMENT

(75) Inventors: Xiaolong Guo, Shenzhen (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 784 days.

(21) Appl. No.: 12/562,932

(22) Filed: Sep. 18, 2009

(65) Prior Publication Data

US 2010/0080186 A1 Apr. 1, 2010

Related U.S. Application Data

(63) Continuation of application No. PCT/CN2008/070552, filed on Mar. 20, 2008.

(30) Foreign Application Priority Data

Mar. 20, 2007 (CN) .......................... 2007 1 0089293
Jun. 7, 2007 (CN) .......................... 2007 1 0111659

(51) Int. Cl.
*H04W 4/00* (2009.01)

(52) U.S. Cl.
USPC ............ 370/329; 370/328; 370/331; 370/338

(58) Field of Classification Search
USPC ......................................... 370/331, 311, 329
See application file for complete search history.

(56) References Cited

U.S. PATENT DOCUMENTS

| | | | |
|---|---|---|---|
| 8,005,008 B2* | 8/2011 | Wang et al. | 370/252 |
| 8,135,043 B2* | 3/2012 | Ogura | 370/390 |
| 2001/0029450 A1* | 10/2001 | Fushimi et al. | 704/229 |
| 2003/0028644 A1* | 2/2003 | Maguire et al. | 709/226 |
| 2004/0053607 A1 | 3/2004 | Ronneke | |
| 2005/0281216 A1 | 12/2005 | Varonen et al. | |

(Continued)

FOREIGN PATENT DOCUMENTS

| | | |
|---|---|---|
| CN | 1585399 A | 2/2005 |
| CN | 1882166 | 12/2006 |

(Continued)

OTHER PUBLICATIONS

U.S. Appl. No. 60/882,610 Automatic Distribution of Server and Gateway Information for Pool Configuration Specification, Dec. 29, 2006, Antal et al. Ericsson Inc.*

(Continued)

*Primary Examiner* — Ian N Moore
*Assistant Examiner* — Jenee Alexander
(74) *Attorney, Agent, or Firm* — Brinks Hofer Gilson & Lione

(57) ABSTRACT

A method and a system for selecting network equipment are provided. The method includes: selecting a primary pool or a pool with the highest priority from preset information when UE needs to select network equipment; and selecting the network equipment for the UE from the selected primary pool or pool with the highest priority. Thus, the relocation times of an MME and a serving SAE gateway are effectively reduced and an operation efficiency of a network is enhanced. Meanwhile, the UE having or subscribing a new service function selects to be attached to the network equipment with the new service function within a pool, such that the diversity demands for service development are satisfied, and the equipment overhead is saved.

16 Claims, 10 Drawing Sheets

(56) References Cited

U.S. PATENT DOCUMENTS

| | | |
|---|---|---|
| 2005/0286558 A1* | 12/2005 | Ould-Brahim et al. ....... 370/467 |
| 2007/0213060 A1* | 9/2007 | Shaheen ....................... 455/436 |
| 2008/0043666 A1* | 2/2008 | Tamura et al. ................ 370/328 |
| 2008/0075041 A1* | 3/2008 | Jen ............................... 370/329 |
| 2008/0098467 A1* | 4/2008 | Miller et al. ....................... 726/5 |
| 2009/0059829 A1* | 3/2009 | Bachmann et al. ........... 370/311 |
| 2009/0067628 A1* | 3/2009 | Pudney et al. ................ 380/247 |
| 2009/0176496 A1* | 7/2009 | Li et al. ......................... 455/437 |
| 2009/0285157 A1* | 11/2009 | Yeoum et al. ................. 370/328 |
| 2009/0303914 A1* | 12/2009 | Gonsa et al. .................. 370/331 |
| 2010/0061301 A1* | 3/2010 | Antal et al. ................... 370/328 |
| 2010/0062774 A1* | 3/2010 | Motegi et al. ................. 370/331 |
| 2010/0080186 A1* | 4/2010 | Guo et al. ..................... 370/329 |

FOREIGN PATENT DOCUMENTS

| | | |
|---|---|---|
| CN | 1882166 A | 12/2006 |
| CN | 101272614 | 12/2010 |
| WO | WO 2005/060297 A1 | 6/2005 |

OTHER PUBLICATIONS

First Chinese Office Action dated (mailed) Jun. 11, 2010, issued in related Chinese Application No. 2007101116594 Huawei Technologies C., Ltd (10 pages.).

Written Opinion of the International Searching Authority (translation) dated (mailed) Jul. 3, 2008, issued in related Application No. PCT/CN2008/070552, filed Mar. 20, 2008, Huawei Technologies C., Ltd (5 pages).

* cited by examiner

METHOD AND SYSTEM FOR SELECTING NETWORK EQUIPMENT

CROSS-REFERENCE TO RELATED APPLICATIONS

This application is a continuation of International Application No. PCT/CN2008/070552, filed on Mar. 20, 2008, which claims the priority of Chinese Patent Application No. 200710111659.4, filed on Jun. 7, 2007 and the priority of Chinese Patent Application No. 200710089293.5, filed on Mar. 20, 2007, all of which are hereby incorporated by reference in their entireties.

FIELD OF TECHNOLOGY

The present disclosure relates to a technology of connecting an access network to a plurality of core networks (Flex), and more particularly to a method and a system for selecting network equipment.

BACKGROUND

A universal mobile telecommunications system (UMTS) is a third generation mobile communication system utilizing a WCDMA air interface technology. Therefore, the UMTS system is usually referred to as a WCDMA communication system. A structure of the UMTS system is similar to that of a second generation mobile communication system, which includes a radio access network (RAN), a core network (CN), and a user equipment (UE). The RAN is adapted to perform all wireless-associated functions. The CN is responsible for performing functions of user location management and service management within the UMTS system, and realizing exchanging and routing functions with an external network. The CN is categorized into a circuit switched domain (CS) and a packet switched domain (PS) in logic.

In order to enhance the performance of the UMTS system, currently, an international program of system architecture evolution (SAE) is in progress. FIG. 1 is a schematic structural drawing of a UMTS system utilizing SAE. As shown in FIG. 1, the system includes a UE 11, an enhanced UMTS terrestrial RAN (EUTRAN) 12, and a CN 13.

The UE 11 and the EUTRAN 12 are connected through an LTE-Uu interface. The EUTRAN 12 includes an evolved node B (briefly referred to as ENB), or may also include other nodes. In the subsequent descriptions, all these nodes are represented by ENBs, which are adapted to receive messages from the UE 11, and to select corresponding network equipment in the CN 13 according to the load balance information. The CN 13 is responsible for performing functions of user location management and service management within the UMTS system, and realizing exchanging and routing functions with an external network. The CN 13 includes a mobility management entity (MME) 131, a serving SAE gateway 132, a packet data network (PDN) SAE gateway (PDN SAE GW) 133, a policy control and charging rules function (PCRF) 134, and a home subscriber system (HSS) 135.

The MME 131 has a control plane function, which is adapted to perform functions such as control plane message processing, mobility management (recording location information of the UE), paging, and authentication with the UE. The MME 131 is connected to the EUTRAN 12 through an S1-MME interface.

The serving SAE gateway 132 has a user plane function, which is adapted to transfer data of the UE. The serving SAE gateway 132 is connected to the EUTRAN 12 and the MME 131 through an S1-U interface and an S11 interface respectively. The MME 131 together with the serving SAE gateway 132 is similar to a serving general packet radio service (GPRS) support node (SGSN) of a UTRAN. As shown by the dotted lines in FIG. 1, the serving SAE gateway 132 is connected to the SGSN through an S4 interface, and the MME 131 is connected to the SGSN through an S3 interface based on a GPRS tunneling protocol (GTP).

The PDN SAE GW 133 has functions of policy enforcement, packet filtering, and the like. The PDN SAE GW 133 is connected to an external data network through an SGi interface, which is similar to a gateway GPRS support node (GGSN) of the UTRAN.

The PCRF 134 is adapted to perform policy associated control functions. The PCRF 134 is connected to the PDN SAE GW 133 and an external data network through an S7 interface and an Rx+ interface respectively.

The HSS 135 is adapted to store users' subscription data. The HSS 135 is connected to the MME 131 through an S6a interface.

In practical applications, the serving SAE gateway 132 and the PDN SAE GW 133 may be located at the same physical node, or may also be located at different physical nodes. Similarly, the MME 131 and the serving SAE gateway 132 may be located at the same physical node, or may also be located at separate physical nodes. When the serving SAE gateway 132 and the PDN SAE GW 133 or the MME 131 and the serving SAE gateway 132 are located at the same physical node, interface signaling between them are converted into internal node messages.

In a conventional UMTS system mode, one access network node can only be connected to one CN node. In a UMTS system utilizing SAE, one access network node is able to be connected to one or more CN nodes, that is, a Flex technology. Flex refers to intra-domain connection of RAN nodes to multiple CN nodes. That is, within one pool, multiple CN nodes (for example, MMEs) are connected to all EUTRAN nodes (for example, ENBs) within the pool. When one UE enters the pool initially, the EUTRAN node is able to select one CN node according to, for example, load balance principle. In such a manner, as long as the UE does not move out of the pool, the access of the UE is always anchored at the selected CN node.

FIG. 2 is a schematic structural drawing of a pool in a UMTS system utilizing SAE. As shown in FIG. 2, a plurality of MMEs forms one MME pool. A plurality of serving SAE gateways forms one serving SAE gateway pool. ENBs within an area of the MME pool are connected to all the MMEs within the MME pool. Similarly, ENBs in an area of the serving SAE gateway pool are connected to all the serving SAE gateways within the serving SAE gateway pool. When the UE initially enters a certain pool area, it may select one MME or serving SAE gateway with a low load in the pool according to, for example, the load balance principle. Once the UE has selected an MME or serving SAE gateway within the pool, as long as the UE moves within the pool, the selected MME or serving SAE gateway does not need to be replaced, thereby avoiding frequent relocation of the CN nodes, until the UE moves out of the pool area. For ease of the illustration below, the MME pool is taken as an example for illustrations as follows. The serving SAE gateway pool is similar to the MME pool. In such a manner, when a failure occurs to the CN node within the system, the UE may select another node within the pool, so as to avoid a single-point failure caused by the UE failing to access the whole failed CN node area.

A pool area includes a complete tracking area (TA). Pool overlapping that one ENB belongs to a plurality of pools (for example, an MME pool and a serving SAE gateway pool) might occur.

FIG. 3 is a schematic structural drawing of an MME pool in the prior art. As shown in FIG. 3, a plurality of MMEs forms one MME pool 1. Another plurality of MMEs forms one MME pool 2. An ENB 1 and an ENB 2 belong to the MME pool 1, and have interfaces with all MMEs in the MME pool 1. An ENB 4 and an ENB 5 belong to the MME pool 2, and have interfaces with all MMEs in the MME pool 2. An ENB 3 belongs to the two MME pools. That is, the ENB 3 has interfaces with all MMEs in the MME pool 1 and the MME pool 2, which is an overlapping part of the MME pool 1 and the MME pool 2. When a UE enters the ENB 1, it selects one MME from the MME pool 1. During the process of moving from the ENB 1 to the ENB 2 and to the ENB 3, the UE does not need to change the MME. When the UE enters the ENB 4, as the ENB 4 only belongs to the MME pool 2, and has no interface with a source MME, the UE needs to select an MME in the MME pool 2 again. When the UE returns from the BNB 4 to the ENB 3 again, as the ENB 3 has an interface with the MME pool 2, the UE does not need to select an MME again. Only when the UE enters the ENB 2, an MME needs to be selected again, so that MME relocation occurs. If the ENB 3 does not have an interface with the MME pool 2, when the UE moves back and forth between the ENB 3 and the ENB 4, ping-pong MME relocation needs to be initiated. That is to say, the pool overlapping avoids ping-pong MME relocation or serving SAE gateway relocation.

TA overlapping and Multi-TA are two possible solutions in the current TA concept. The TA overlapping indicates that only one TA can be assigned to one UE each time. An ENB may belong to two TAs at the same time. When the TA is changed, a TA update (TAU) is initiated. The Multi-TA indicates that one UE may be assigned with a plurality of TAs (a TA list), and each cell only broadcasts one TA identification (TA ID). In such a manner, when the UE moves within the assigned TAs, no TAU needs to be initiated (except the circumstance that a periodic location update needs to be initiated). If the UE moves to one TA that is not in the TA list of the UE, a TAU needs to be initiated. After the TAU, the UE receives a new TA list.

FIG. 4 is a schematic structural drawing of a pool combined with Multi-TA in the prior art. As shown in FIG. 4, when the pool overlapping does not exist in a system, for example, an MME pool 2 is not connected to ENB 2/3 of a TA 2 (not shown), the UE is assigned with a TA list {TA 1, TA 2} in an MME pool 1. When the UE moves to a TA 3, a TAU is initiated, and the UE is assigned with a TA list {TA3, TA4}. In such a manner, when the UE moves back and forth between the TA 2 and the TA 3, ping-pong TAU and ping-pong MME relocation may occur.

When the pool overlapping exists, for example, the MME pool 2 is connected to both the ENB 2/3 of the TA 2 (as shown by dotted lines in FIG. 4), the UE may be assigned with a TA list {TA 1, TA 2} in the MME pool 1. When the UE moves to the TA 3, the UE may be assigned with a TA list {TA 2, TA3, TA4}. The ping-pong TAU and the ping-pong MME relocation are avoided when the UE moves back and forth between the TA 2 and the TA 3.

In the examples above, as a concept of a pool is introduced, when the UE moves into a new area or is attached or handed over, a problem of how the UE selects a suitable network node is involved. In the prior art, the UE simply selects one node with a low load from a pool according to the load balance information, which may cause the following problems. In the prior art, a situation that one ENB belongs to a plurality of pools is not considered at all. If the selection is improper, the CN node relocation probably occurs. In addition, different nodes between the pools or within one pool may have different capabilities. In order to reduce network cost and increase an operation efficiency of the network, a manner of selecting a suitable node for the UE to meet the requirements of the services needed by the UE needs to be considered.

BRIEF SUMMARY

Accordingly, the present disclosure is directed to a method for selecting network equipment, so as to reduce a probability of CN node relocation, and enhance an operation efficiency of a network.

The present disclosure is further directed to a system for selecting network equipment, so as to reduce a network cost and enhance an operation efficiency of the network.

A method for selecting a network equipment is provided. The method includes the following steps:

When a UE needs to select a network equipment, a primary pool or a pool with the highest priority is selected according to preset information.

The network equipment is selected for the UE from the selected primary pool or the selected pool with the highest priority.

Another method for selecting a network equipment is provided. The method includes the following steps:

A selection algorithm of a network equipment is weighted according to priority of a pool where the network equipment belongs to.

The network equipment is selected for the UE according to weighted calculation results.

A system for selecting a network equipment is provided. The system includes a first information selecting unit and a second information selecting unit.

The first information selecting unit is adapted to select a primary pool or a pool with the highest priority for a UE according to preset information when the UE needs to select network equipment.

The second information selecting unit is adapted to select the network equipment for the UE from the selected primary pool or the selected pool with the highest priority.

As seen from the above-described embodiments, in the method and the system for selecting network equipment according to the embodiments of the present disclosure, a primary pool or a pool with the highest priority is selected according to location information of the UE or an ENB, and then specific equipment within the pool is selected according to load balance principles. When equipments having different capabilities exist in the pool, certain equipment having a suitable capability is selected through a EUTRAN, or a CN requires the EUTRAN to select a node again, or node relocation occurs according to the service demands. Therefore, the relocation times of the MME or the serving SAE gateway are effectively reduced, and the operation efficiency of the network is enhanced. Moreover, the UE having or subscribing a new service function selects to be attached to network equipment having the new service function within the pool, so as to meet the diversity demands of service development and save the equipment overhead.

DETAILED DESCRIPTION OF THE EMBODIMENTS

To make embodiments of the present disclosure more comprehensible, the present disclosure is illustrated in detail below with reference to accompanying drawings and through the embodiments.

In the embodiments of the present disclosure, a primary pool or a pool with the highest priority is selected from preset information according to location information of a UE or an ENB. Then, specific equipment within the pool is selected according to load balance principles. When equipments having different capabilities exist in the pool, certain equipment having a suitable capability is selected through a EUTRAN, or a CN requires the EUTRAN to select a node again, or node relocation occurs according to service demands.

First of all, on the basis of the concept of a pool, the following inferences are made (an MME is taken as an example, and a serving SAE gateway is similar to the MME).

Inference 1: an overlapping part is a complete TA.

As discussed above, a pool is formed by complete TAs. Therefore, one TA is unable to span across different pools. That is to say, if one TA is formed by a plurality of ENBs, it is impossible that some of the ENBs completely belong to one pool, and the other ENBs completely belong to another pool.

Figure 1:
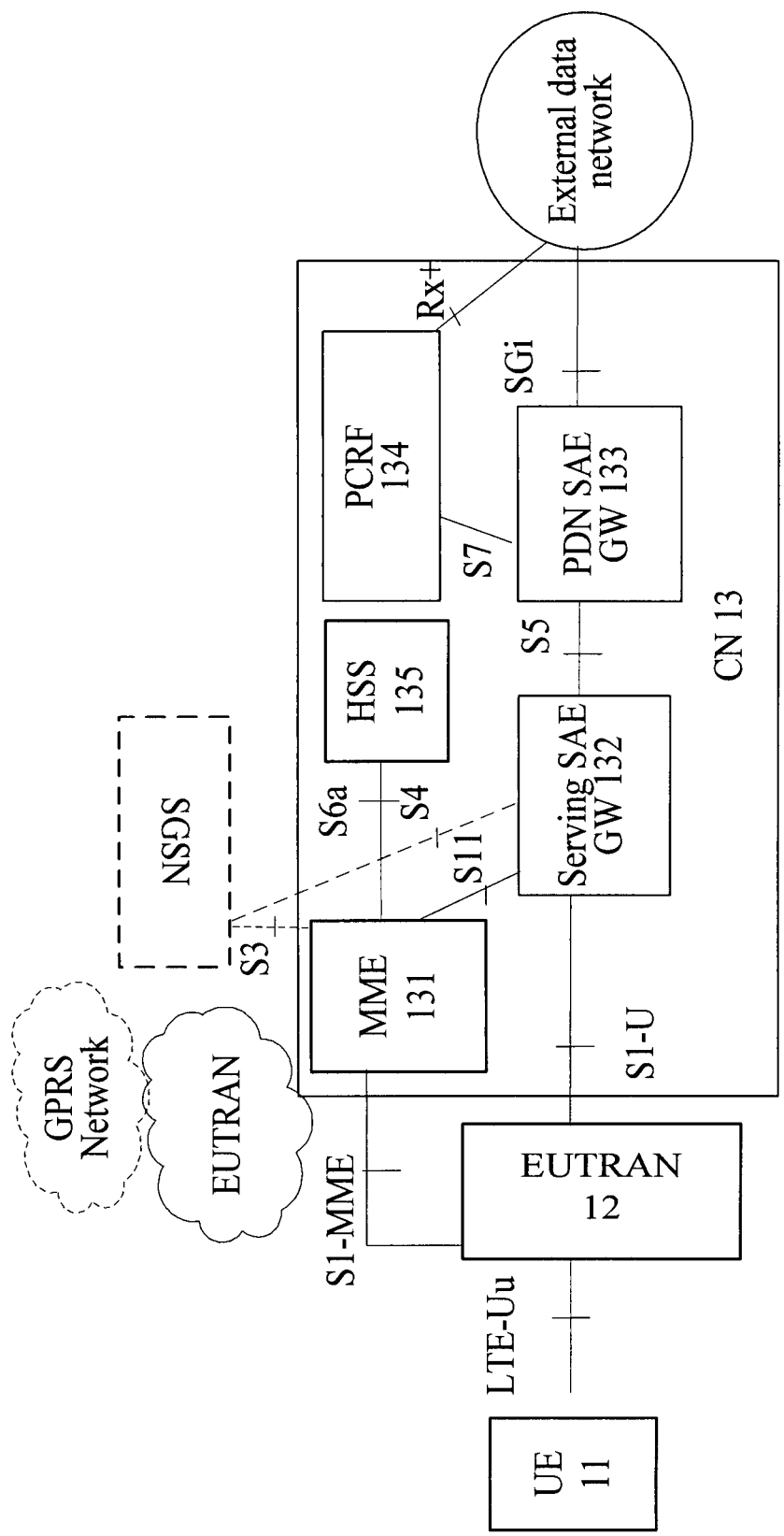
FIG. 1 is a schematic structural drawing of a UMTS system utilizing SAE.
Figure 2:
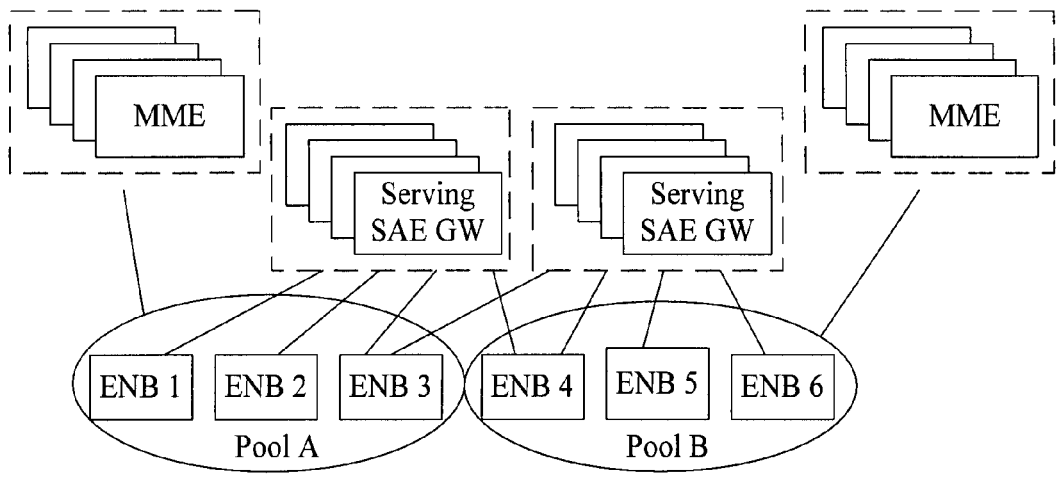
FIG. 2 is a schematic structural drawing of a pool in a UMTS system utilizing SAE.
Figure 3:
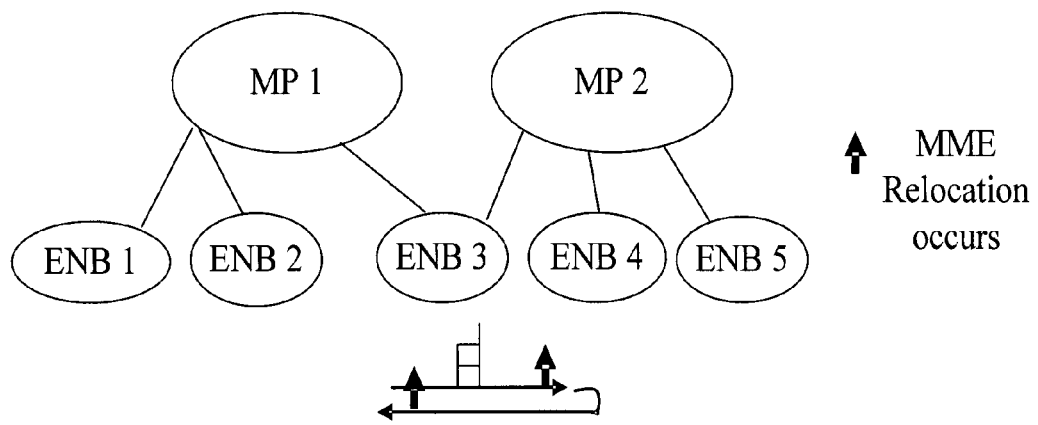
FIG. 3 is a schematic structural drawing of an MME pool in the prior art.
Figure 4:
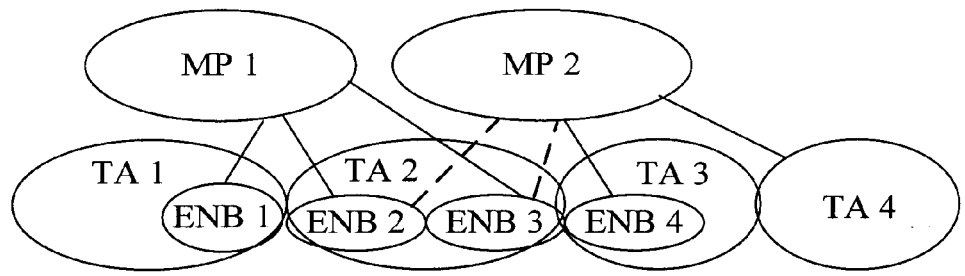
FIG. 4 is a schematic structural drawing of a pool combined with Multi-TA in the prior art.
Figure 5:
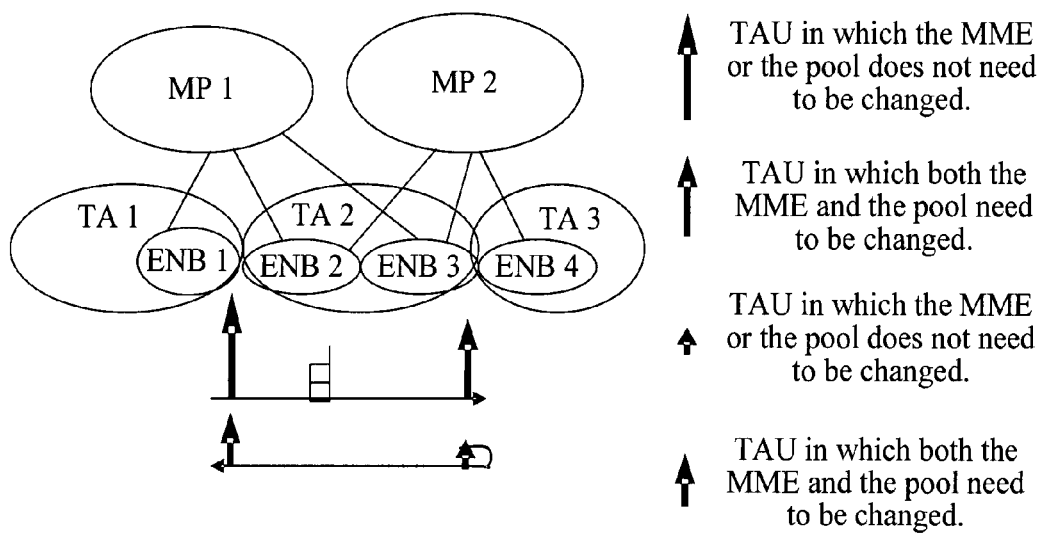
FIG. 5 is a schematic structural drawing of a pool overlapping part being a complete TA.

FIG. 5 is a schematic structural drawing of a pool overlapping part being a complete TA. As shown in FIG. 5, when the UE enters an ENB 1, it selects one MME from an MME pool 1. When the UE moves from the ENB 1 to an ENB 2, the TA is changed. A TAU needs to be initiated. However, the MME or the pool does not need to be replaced. When the UE moves from the ENB 2 to an ENB 3, the TA is not changed, so that no TAU needs to be initiated. When the UE moves from the ENB 3 to an ENB 4, the TA is changed. As no interface exists between the ENB 4 and a source MME, the MME and the pool need to be replaced. When the UE returns from the ENB 4 to the ENB 3, the TA is changed. However, the MME or the pool does not need to be replaced. When the UE moves from the ENB 3 to the ENB 2, the TA is not changed, and no TAU needs to be initiated. When the UE moves from the ENB 2 to the ENB 1, the TA is changed. As no interface exists between the ENB 1 and the source MME, the MME and the pool need to be replaced. If no interface exists between the ENB 3 and the MME pool 1 in FIG. 5, the MP 1 is not formed by complete TAs, and a definition of the pool is breached.

In addition, on the basis of FIG. 5, a primary pool and a pool priority according to the embodiment of the present disclosure are illustrated in detail.

The primary pool and a neighboring pool are both directed to a certain ENB. If one UE accesses through this ENB, one pool having the lowest probability of CN node relocation and changing of pools is selected. Such a pool is referred to as a primary pool of the ENB. The other pools of this ENB are referred to as neighboring pools of the ENB.

The ENB may be configured with a pool list, in which the pools are listed according to priorities. A pool with the highest priority is similar to a primary pool. When the UE accesses the ENB, if the ENB is not connected with a CN node where the UE is originally registered, the UE should be registered at one CN node in the pool with the highest priority of the ENB. By selecting the pool with the highest priority in the ENB, a probability of changing the MME or the serving SAE GW is reduced.

In FIG. 5, the ENB 2 and the ENB 3 are overlapping parts of the MME pool 1 and an MME pool 2. As a location of the ENB 2 is close to the MME pool 1, the MME pool 1 is defined as a primary pool of the ENB 2, and the MME pool 2 is defined as a neighboring pool of the ENB 2. Similarly, as a location of the ENB 3 is close to the MME pool 2, the MME pool 2 is defined as a primary pool of the ENB 3, and the MME pool 1 is defined as a neighboring pool of the ENB 3. Alternatively, one priority list of pools is defined for each ENB. For example, a pool configuration of (MME pool 1, MME pool 2, MME pool 3) is defined for the ENB 2, which indicates that a priority of the MME pool 1 is higher than that of the MME pool 2, and the priority of the MME pool 2 is higher than that of the MME pool 3.

In practical applications, if one ENB belongs to a plurality of (>=2) pools, the ENB may have a plurality of primary pools or neighboring pools.

When a new UE enters the ENB, for example, the UE camps on the ENB 2 after being powered on, or when the UE moves or is handed over to the ENB 2, or when the ENB needs to select a new MME or serving SAE gateway for the UE, that is, no interface exists between the ENB and the source MME or serving SAE gateway of the UE, or no source CN node exists, or a failure occurs to the source CN node for example, the source MME or the source serving SAE gateway, or a failure occurs to a link, or the load of the source MME or the source serving SAE gateway or the link exceeds a threshold, or due to other reasons, network equipment in a primary pool or a pool with the highest priority is selected first. For example, after the UE initially accesses (for example, is attached to) the ENB 2, the MME pool 1 is selected first, and then the UE is attached to an MME in the MME pool 1. In such a manner, when the UE moves to the ENB 1 or the ENB 3, no MME relocation needs to be initiated. Otherwise, if an MME in the MME pool 2 is selected, when the UE moves to the ENB 1, as no interface exists between the ENB 1 and the MME pool 2, the MME relocation needs to be initiated.

In practical applications, a primary pool and a neighboring pool of a serving SAE gateway or a priority list of pools of the serving SAE gateway of the ENB may also be defined.

Inference 2: in the situation of TA overlapping, a pool overlapping part may not be a complete TA.

In FIG. 5, one idle UE moves from the ENB 1 to the ENB 4 sequentially, and then returns to the ENB 1. If the UE is assigned with only one TA each time, when the TA is changed, a TAU needs to be initiated. The MME relocation only occurs when the UE moves from the ENB 3 to the ENB 4 and moves from the ENB 2 to the ENB 1, that is, no ping-pong MME relocation occurs. In practical applications, the ENB may belong to two TAs at the same time.

Figure 6:
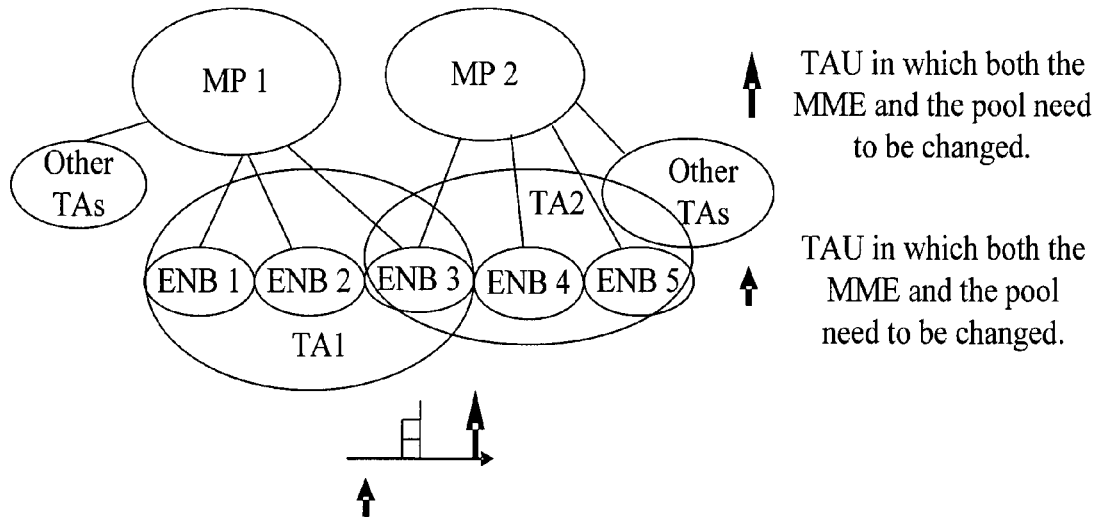
FIG. 6 is a schematic structural drawing of a pool combined with TA overlapping.

FIG. 6 is a schematic structural drawing of a pool combined with TA overlapping. As shown in FIG. 6, the ENB 3 belongs to two TAs at the same time, that is, the TA 1 and the TA 2. The IDs of the two TAs are broadcasted. Only the TA 1, instead of the TA 2, is able to be seen at the MME pool 1, and the TA 1 is unable to be seen at the MME pool 2. In such a manner, the pool overlapping part may be smaller than one TA. When the UE moves from the ENB 3 to the ENB 4, the TA is changed, and the MME and the pool need to be replaced. When the UE returns from the ENB 3 to the ENB 2, the TA is changed, and the MME and the pool also need to be replaced.

Inference 3: an application principle of Multi-TA and pools is that a TA list assigned to a UE cannot span across pools. That is to say, a TA that is not managed by an MME where the UE is registered cannot be assigned. If a TA that is not managed by the MME where the UE is registered is assigned, the paging fails to be delivered to the TA (except the circumstance that the MME requires an MME of other pools to forward the paging).

On the basis of the above three inferences, a system for selecting network equipment provided according to an embodiment of the present disclosure is illustrated below in detail.

Figure 7:
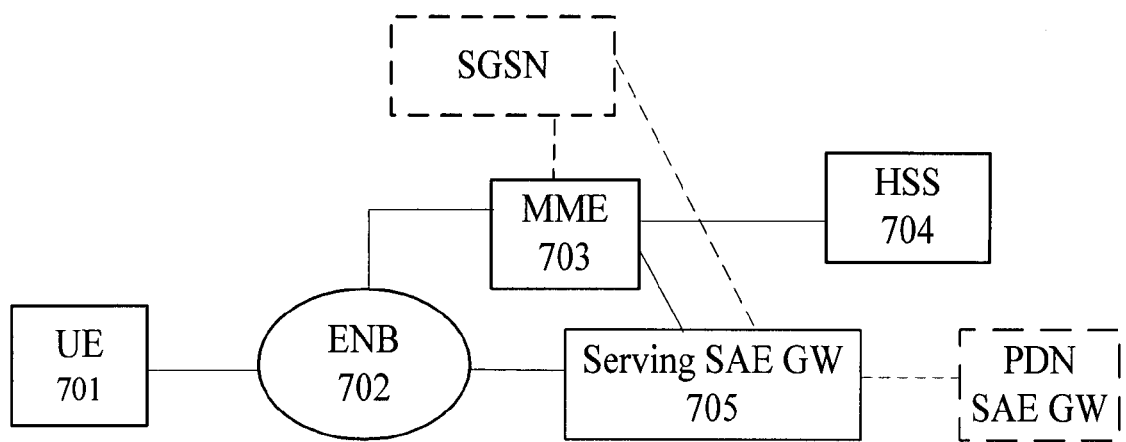
FIG. 7 is a schematic structural drawing of a system for selecting network equipment according to an embodiment of the present disclosure.

FIG. 7 is a schematic structural drawing of a system for selecting network equipment according to an embodiment of the present disclosure. As shown in FIG. 7, the system includes a UE 701, an ENB 702, an MME 703, an HSS 704, and a serving SAE gateway 705.

The UE 701 is adapted to send an initial direct transfer message to the ENB 702.

The ENB 702 presets information of a primary pool and/or priorities of pools. The ENB 702 is adapted to receive the initial direct transfer message sent by the UE 701. When a new MME or serving SAE gateway needs to be selected, the primary pool or a pool with the highest priority is selected from preset information according to location information of the UE 701. Then, the MME 703 or the serving SAE gateway 705 within the pool is selected according to capability information and/or load balance principles. If a new serving node needs to be selected and a serving SAE gateway is selected by the MME 703, when it is found that no information of a primary pool of the serving SAE gateway 705 is configured in the MME 703, information of the primary pool of the serving SAE gateway 705 configured for the ENB 702 is carried in the message sent by the MME 703.

The MME 703 is adapted to receive a message sent by the ENB 702. When a new serving SAE gateway 705 needs to be selected and the serving SAE gateway is selected by the MME 703, if the pool information of the serving SAE gateway 705 of the ENB 702 is configured in the MME 703, a primary pool of the serving SAE gateway 705 or a pool with the highest priority of the serving SAE gateway 705 is directly selected according to the configuration information. The serving SAE gateway 705 within the pool is then selected according to capability information and/or load balance principles. If no pool information of the serving SAE gateway 705 of the ENB 702 is configured in the MME 703, the pool information of the serving SAE gateway 705 is obtained from the received message. The serving SAE gateway 705 within the pool is then selected according to capability information and/or load balance principles.

Alternatively, certain specific equipment may store information of pools to which an ENB is connected. The ENB or the MME may enquiry the specific equipment for pool information of the ENB or obtain a primary pool of the ENB.

The HSS 704 is adapted to interact with the MME 703, so as to perform registration for the UE and update location information of the UE 701.

The serving SAE gateway 705 is adapted to receive a message sent by the MME 703 and activate relevant services of the UE 701.

In practical applications, when the UE accesses through a 2G/3G access system, the ENB is a SGSN. The SGSN selects a pool and further selects an MME. When a handover occurs within the system or an abnormal situation occurs, the ENB is the MME.

Figure 8:
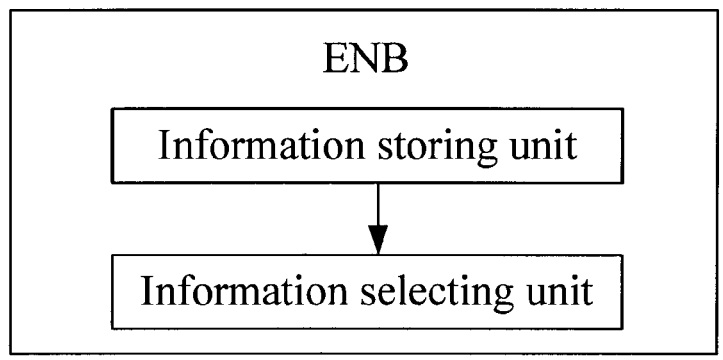
FIG. 8 is a schematic structural drawing of an ENB according to an embodiment of the present disclosure.
Figure 8A:
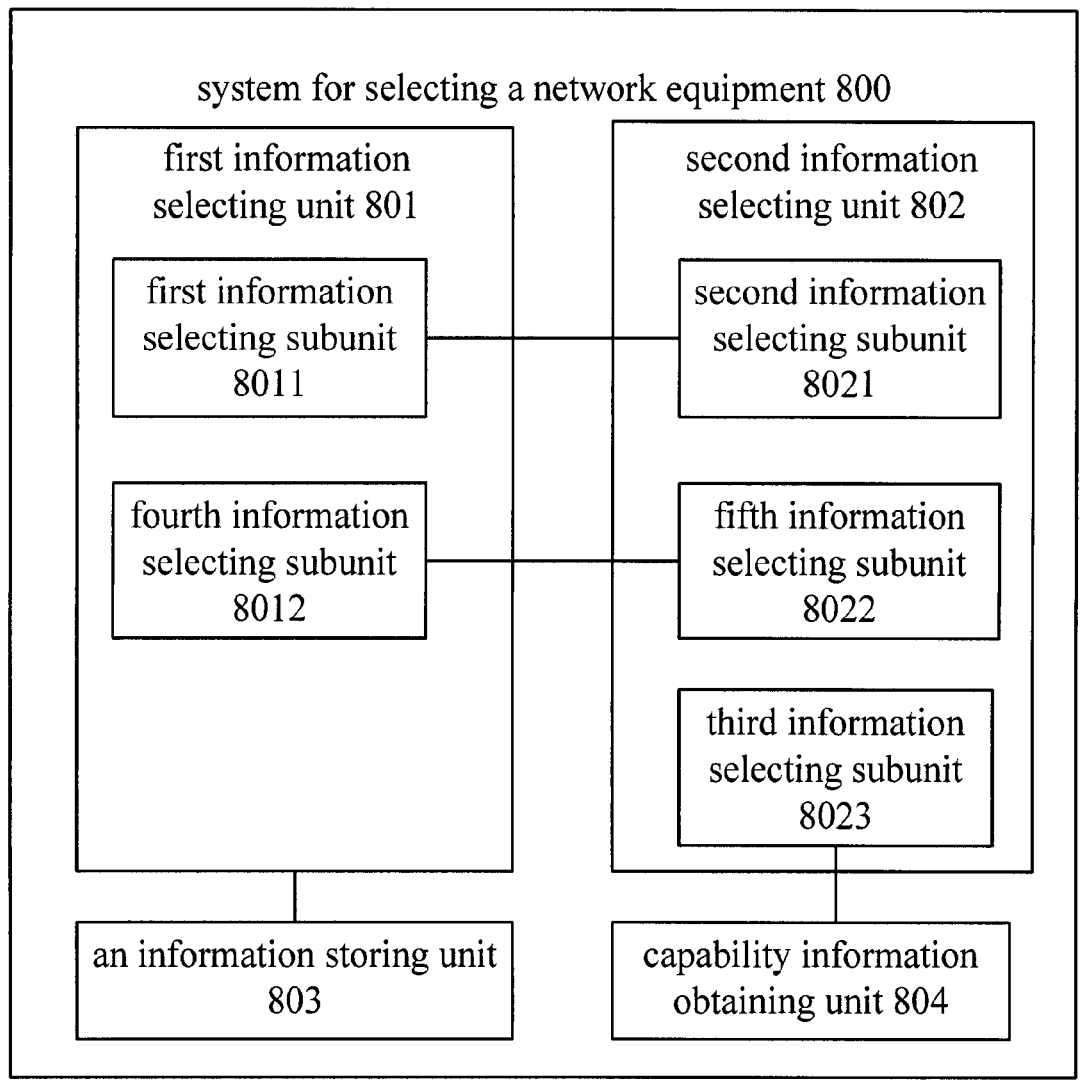
FIG. 8A is another schematic structural drawing of a system for selecting a network equipment according to an embodiment of the present disclosure.

FIG. 8 is another schematic structural drawing of a system for selecting network equipment according to an embodiment of the present disclosure. As shown in FIG. 8, the system 800 includes a first information selecting unit 801 and a second information selecting unit 802.

The first information selecting unit 801 is adapted to select a primary pool or a pool with the highest priority according to preset information when a user equipment, UE, needs to select a network equipment. The second information selecting unit 802 is adapted to select the network equipment for the UE from the selected primary pool or the selected pool with the highest priority.

The first information selecting unit 801 may include a first information selecting subunit 8011. The first information selecting subunit 8011 is adapted to select a primary pool or a pool with the highest priority of the MME 703 for the UE 701 when the MME 703 needs to be selected for the UE 701. Meanwhile, the second information selecting unit 802 may include a second information selecting subunit 8021. The second information selecting subunit 8021 is adapted to select the MME 703 for the UE from the selected primary pool or pool with the highest priority of the MME 703.

The first information selecting unit 801 may also include a fourth information selecting subunit 8012. The fourth information selecting subunit 8012 is adapted to select a primary serving SAE gateway pool or a serving SAE gateway pool with the highest priority for the UE when the serving SAE gateway 705 needs to be selected for the UE 701. While, While, the second information selecting unit 802 may include a fifth information selecting subunit 8022. The fifth information selecting subunit 8022 is adapted to select the serving SAE gateway for the UE from the selected primary serving SAE gateway pool or serving SAE gateway pool with the highest priority.

The system 800 may further include an information storing unit 803. The information storing unit 803 adapted to store preset information of a primary pool and/or priorities of pools.

The system 800 may further include a capability information obtaining unit 804. The capability information obtaining unit 804 is adapted to obtain capability information needed by the UE. Meanwhile, the second information selecting unit may include a third information selecting subunit 8023. The third information selecting subunit 8023 is adapted to select the network equipment for the UE from the selected primary pool or the selected pool with the highest priority according to the capability information and/or load balance information needed by the UE.

The selected ENB according to an embodiment of the present disclosure is illustrated below in detail.

FIG. 8 is a schematic structural drawing of an ENB according to an embodiment of the present disclosure. As shown in FIG. 8, the ENB includes an information storing unit and an information selecting unit.

The information storing unit is adapted to store preset information of a primary pool and/or priorities of pools.

The information selecting unit is adapted to select a primary pool or a pool with the highest priority from the preset information and then select network equipment from the pool when new network equipment needs to be selected for the UE.

The information selecting unit further includes a first information selecting unit and a second information selecting unit.

The first information selecting unit is adapted to select a primary pool or a pool with the highest priority for the UE from the preset information when network equipment needs to be selected for the UE.

The second information selecting unit is adapted to select network equipment for the UE from the selected primary pool or pool with the highest priority.

The ENB may further include a capability information obtaining unit adapted to obtain capability information needed by the UE.

The second information selecting unit may further include a third information selecting subunit, and the third information selecting unit is adapted to select network equipment for the UE from the selected primary pool or pool with the highest priority according to the capability information and/or load balance information needed by the UE.

A structure of the SGSN is similar to that of the ENB, which is not described here repeatedly.

A method for selecting network equipment provided according to an embodiment of the present disclosure is illustrated in detail below.

Figure 9:
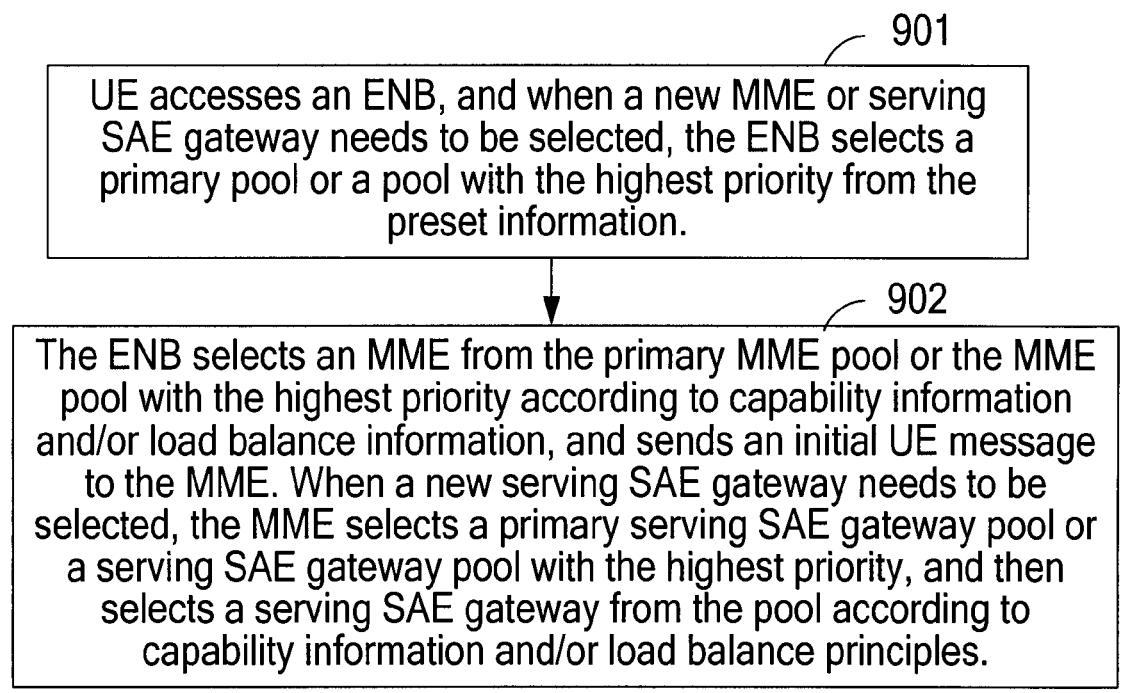
FIG. 9 is a schematic flow chart of a method for selecting network equipment according to an embodiment of the present disclosure.

FIG. 9 is a schematic flow chart of a method for selecting network equipment according to an embodiment of the present disclosure. As shown in FIG. 9, the information of a primary pool and/or priorities of pools is preset in an ENB. The method includes the following steps.

In Step 901, a UE accesses an ENB, and when a new MME or serving SAE gateway needs to be selected, the ENB selects a primary pool or a pool with the highest priority from the preset information.

In this step, the ENBs in each overlapping part are configured with a primary pool and neighboring pools, and/or a priority list of pools. When the UE accesses initially, for example, the UE is attached or handed over, the ENB selects a primary MME pool or an MME pool with the highest priority configured on the ENB.

In Step 902, the ENB selects an MME from the primary MME pool or the MME pool with the highest priority according to capability information and/or load balance information, and sends an initial UE message to the MME. When a new serving SAE gateway needs to be selected, the MME selects a primary serving SAE gateway pool or a serving SAE gateway pool with the highest priority, and then selects a serving SAE gateway from the pool according to capability information and/or load balance principles.

In this step, the ENB selects an MME or a serving SAE gateway from a corresponding pool according to load balance principles. The serving SAE gateway may be selected through the ENB, or may also be selected by the MME. The initial UE message includes contents such as an attach request, or redirection identification.

If the MME selected by the ENB is configured with information of the primary serving SAE gateway pool of the ENB, the MME directly selects the primary serving SAE gateway pool according to the configuration information.

If only the ENB, instead of the MME selected by the ENB, is configured with the information of the primary serving SAE gateway pool, when the ENB sends an initial UE message to the MME, the information of the serving SAE gateway pool configured for the ENB is carried, such as network resource identification (NRI) values of the primary serving SAE gateway pool or the serving SAE gateway pool with the highest priority or a priority list of all the serving SAE gateway pools.

After selecting the primary serving SAE gateway pool for the ENB, the MME further selects a serving SAE gateway from the primary serving SAE gateway pool according to capability information and/or load balance principles.

In the subsequent handing over or moving process of the UE, when the ENB needs to select a network entity again, if a target ENB has an interface with a source MME or a source serving SAE gateway or no other abnormality occurs (such as a source node failure), even if the source MME or the source serving SAE gateway are not in the primary pool of the ENB, the target ENB can still keep the source MME or the source serving SAE gateway unchanged, thereby avoiding the ping-pong relocation.

In practical applications, if the ENB has a plurality of primary pools or a plurality of pools with the highest priority, the ENB may select a certain pool randomly, or may also select one of the pools according to a certain algorithm, or may also directly select from all MMEs/serving SAE gateways in these pools with the same highest priority according to a load situation. These pools are similarly regarded as one primary pool.

In addition, an MME/serving SAE gateway may also be selected through the following manners.

An MME or serving SAE gateway having the lowest load is selected from all the MMEs or serving SAE gateways connected to the ENB that may belong to different pools.

Alternatively, when the primary pool or the pool with the highest priority reaches a certain condition, including, for example, all equipments in the primary pool or the pool with the highest priority have high loads, or the loads of all equipments in the primary pool or the pool with the highest priority exceed a threshold, or no equipment has the capability needed by the UE or these equipments have high loads, a neighboring pool or a pool with second highest priority is selected during the attachment or handing over process, and then an MME or a serving SAE gateway is selected according to capability information and/or load balance principles.

Alternatively, although the ENB still has an interface with the source MME or serving SAE gateway, as a certain threshold is reached due to the source node failure or due to reasons of its load or link, the ENB may select a primary pool or a pool with the highest priority or other pools, and further select a suitable MME or serving SAE gateway there-from.

Alternatively, during the process of selecting an MME or serving SAE gateway by the ENB or selecting a serving SAE gateway by the MME, a pool where the MME belongs to is helpful for the selection of an MME, that is, a selection algorithm of an MME is weighted by the pool where the MME belongs to. That is to say, the selection algorithm of the MME is weighted according to different priorities of the pools where the MME belongs to. For example, it is assumed that the ENB accessed by the UE is connected to three pools with different priorities: pool 1/pool 2/pool 3. The pool 1 has an MME 1 and an MME 2, which have the loads of 80% and 70% respectively. The pool 2 has an MME 3 and an MME 4, which have the loads of 50% and 60% respectively. The pool 3 has an MME 5 and an MME 6, which have the loads of 45% and 50% respectively. The network configures that a priority coefficient of the pool 1 is 1, a priority coefficient of the pool 2 is 1.2, and a priority coefficient of the pool 3 is 1.5. The ENB selects an MME by comparing the following weighted calculation results: MME 1=80%*1=80%, MME 2=70%*1=70%, MME 3=50%*1.2=60%, MME 4=60%*1.2=72%, MME 5=45%*1.5=67.5% and MME 6=50%*1.5=75%. In such a manner, the pool 1 serves as a pool with the highest priority for the UE, and the MME 5 in the pool 3 serves as the equipment having the lowest load. However, according to the weighted calculation results, the MME 3 in the pool 2 has the lowest comprehensive load. Therefore, the MME 3 is selected as the final MME. In this embodiment, the influences on the MME selection generated by the pool priorities configured through the ENB are discussed by taking the load situation as an example. Equivalently, all MMEs in different pools are regarded as MMEs in one pool first. Then, the MMEs are respectively weighted according to priorities of the pools where they belong to. Finally, suitable MMEs are selected according to results of the weighted algorithm. Definitely, the weighting of "Add operation" may also be performed. For example, the ENB configures that a weighted value of the pool 1 is 0%, a weighted value of the pool 2 is 10%, and a weighted value of the pool 3 is 20%. The MMEs are compared as follows. It is calculated that a load of the MME 1 is 80%+0%=80%, a load of the MME 2 is 70%+0%=70%, a load of the MME 3 is 50%+10%=60%, a load of the MME 4 is 60%+10%=70%, a load of the MME 5 is 45%+20%=65%, and a load of the MME 6 is 50%+20%=70%. Therefore, the ENB selects the MME 3 with the lowest "load" (not the actual load). In addition, different ENBs (located in an overlapping area) may configure different weighted values. For example, the ENB closest to the pool 1 configures higher weighted values for the pool 2/3. The ENB second closest to the pool 1 configures lower weighted values for the pool 2/3. The ENB closest to the pool 2 configures higher weighted values for the pool 1/3, and the like.

When the MMEs or serving SAE gateways having different capabilities exist, even different MMEs further have different weighted values to affect the MME selection. For example, a capacity of the MME 1 is 1 million users, a capacity of the MME 2 is 1.50 million users, a capacity of the MME 3 is 1 million users, a capacity of the MME 4 is 2 million users, a capacity of the MME 5 is 2 million users, and a capacity of the MME 6 is 1.50 million users. Combined with the method described above, a weight of the MME 1 is set as 1, a weight of the MME 2 is set as 1.5, a weight of the MME 3 is set as 1, a weight of the MME 4 is set as 2, a weight of the MME 5 is set as 2, and a weight of the MME 6 is set as 1.5. Thus, a selection algorithm for the MME carried out by the ENB is as follows. The load of each MME is calculated. For example, a load of the MME 1 is (80%+0%)/1=80%, a load of the MME 2 is (70%+0%)/1.5=47%, a load of the MME 3 is (50%+10%)/1=60%, a load of the MME 4 is (60%+10%)/2=35%, a load of the MME 5 is (45%+20%)/2=32.5%, and a load of the MME 6 is (50%+20%)/1.5=47%. Therefore, the ENB selects the MME 5 with the "lowest calculated load" according to the calculated loads.

In practical applications, a selection of a serving SAE gateway by an ENB or a selection of a serving SAE gateway by an MME is similar to the selection of the MME by the ENB, which is not further described repeatedly here.

In the above embodiments, the capabilities of all network equipments, for example, MMEs or serving SAE gateways in one pool are consistent. In such a manner, when a EUTRAN selects network equipment from one pool, it simply selects the network equipment with a light load according to load balance information. Furthermore, network equipments having different capabilities may exist in one pool. For example, as new services such as SAE voice call continuity (VCC) and multicast/broadcast multimedia scheme (MBMS) have been introduced into a mobile network, if it requires all network equipments in the pool to have such functions, great expenses and overhead of the equipments are definitely produced. However, if only a part of network equipments in one pool have certain special service functions, and the other network equipments do not have these functions, common UEs select to be attached to common network equipments, and those UEs having or subscribing special service functions select to be attached to the network equipments having the special service functions. For example, as for UEs having MBMS capabilities, the UEs may select MMEs or serving SAE gateways having MBMS capabilities. Then, the UEs can use the MBMS services, so as to save the overhead of the network equipments.

Figure 10A:
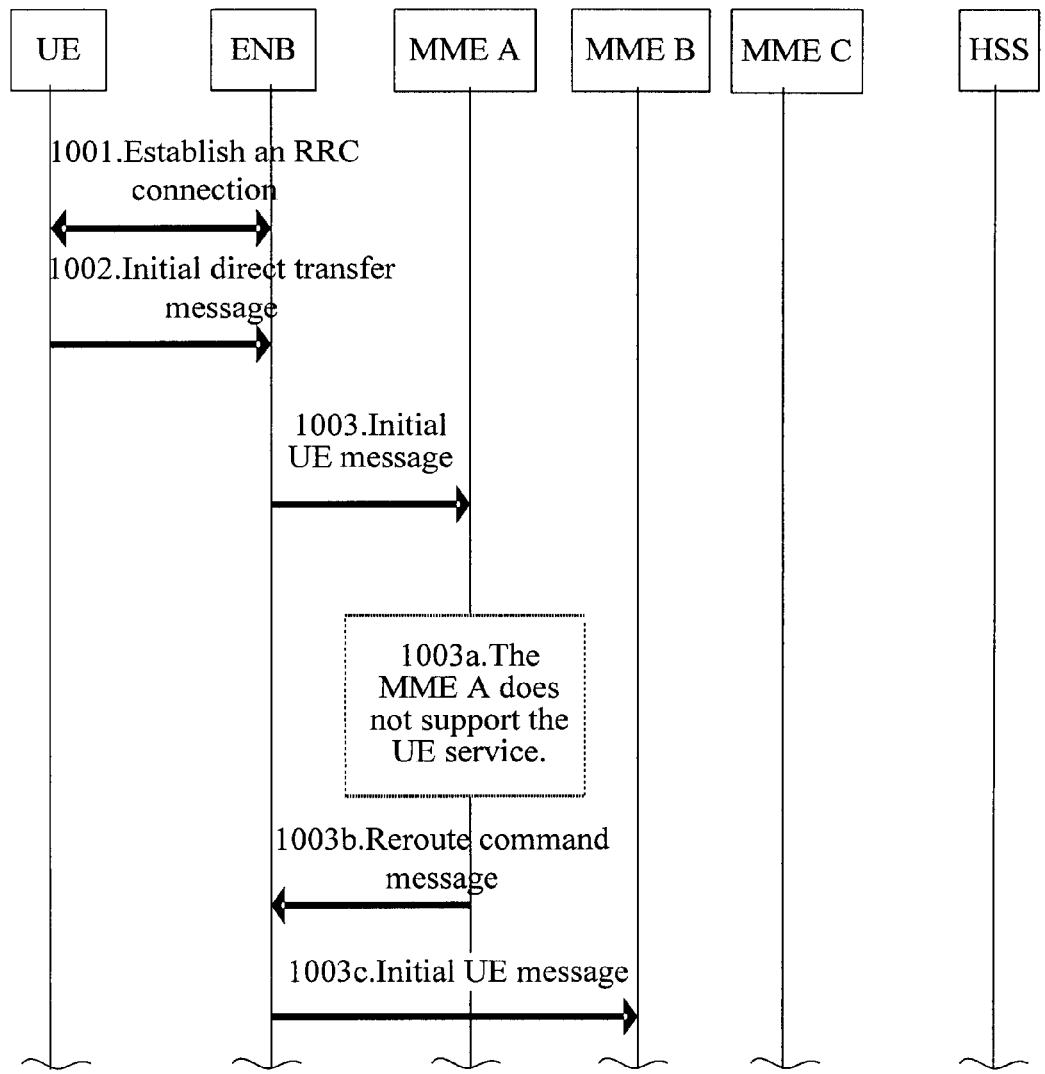
FIG. 10 is a schematic flow chart of a method for selecting network equipments having different capabilities according to an embodiment of the present disclosure.
Figure 10B:
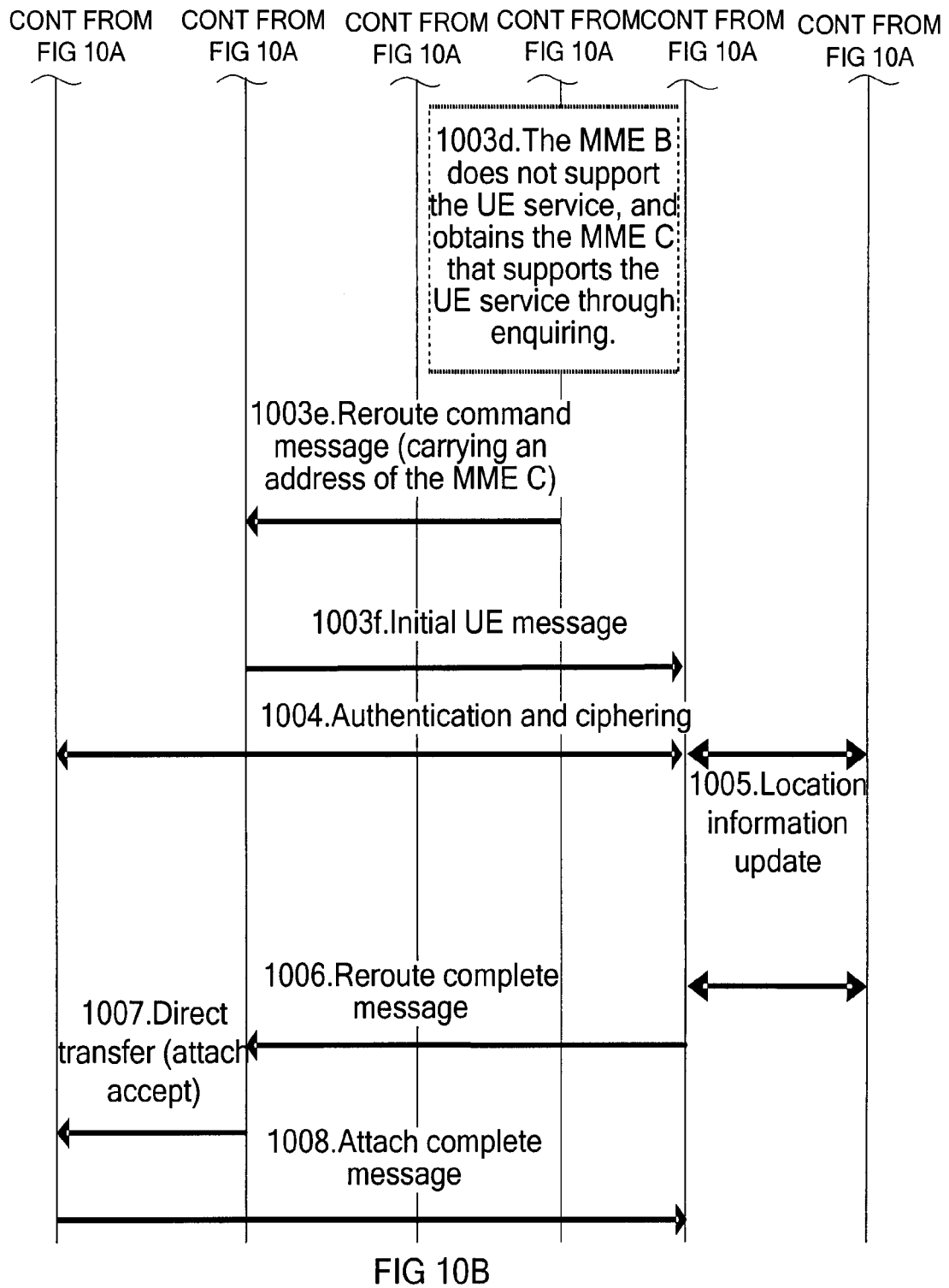

FIG. 10 is a schematic flow chart of a method for selecting network equipments having different capabilities according to an embodiment of the present disclosure. As shown in FIG. 10, the method includes the following steps.

In Step 1001, a radio resource control (RRC) connection is established between a UE and an ENB in a EUTRAN node.

In Step 1002, the UE sends an RRC initial direct transfer message to the ENB.

In this step, the initial direct transfer message sent to the ENB by the UE, or an RRC connection request message carries an information element (IE) of a certain service capability of network equipment required by the UE, for example, an MBMS capability. Alternatively, a radio network controller (RNC) enquires the UE through an RRC UE capability enquiry message. Then, the UE informs the ENB that the UE needs to access a CN node having certain service capability through UE capability information. Alternatively, a non-access stratum (NAS) message sent to the CN node by the UE or an evolved radio access network application part (E-RANAP) message from the ENB to the MME carries an IE of capability requirement for the network equipment by the UE.

In Step 1003, the ENB receives the RRC message, sends an initial UE message to the MME, and selects suitable network equipment for the UE.

In this step, the ENB receives the RRC message, and obtains the capability information of network equipment required by the UE, so that the ENB is instructed to select network equipment having the capability required by the UE. If the ENB can obtain information of the equipment having the required capability through its own configuration information or enquiring related entities, the ENB selects one of the equipments having the capability, which may include the following steps. A primary pool or a pool with the highest priority is selected first, and then an MME satisfying the service capability of the UE is selected from the pool according to load balance principles.

In practical applications, the ENB may fail to select the equipment having the capability required by the UE, for example, the ENB is not configured with related capability information. In this case, if the MME receives the initial UE message carrying an attach request and redirection identification and finds that the MME itself does not support the service requirements of the UE, the MME sends a reroute command message to the ENB. The ENB then selects another MME, and sends the initial UE message to the selected MME, until the network equipment having the capability required by the UE is selected. Alternatively, when the MME receives the initial UE message carrying an attach request, redirection identification, and internet mobile subscriber identification (IMSI), and finds that the MME itself does not support the service requirements of the UE, the MME obtains network equipment having the capability required by the UE through its own configuration or enquiring other entities. Then, the MME sends a reroute command message to the ENB, carrying address information of the network equipment having the capability required by the UE. Then, the ENB directly sends the initial UE message to the network equipment having the capability required by the UE.

In Step 1004, the network equipment returns an authentication and ciphering message to the UE.

In this step, if the ENB selects an MME satisfying the service capability of the UE, the MME interacts with an HSS, and authentication, authorization, and registration are performed between the MME and the UE. The MME returns an authentication and ciphering message to the UE. Otherwise, the initial UE message or an NAS message is received, so as to obtain capability requirements for the network equipment of the UE. If the MME does not support the UE service, the MME returns a reroute command message to the ENB. The reroute command message may carry capability information of the network equipment required to be selected, or may not carry any information. The ENB is informed to select an MME having the service capability of the UE. The ENB selects an MME having the service capability of the UE and sends an RRC initial direct transfer message to the MME, the registration is successful, and then the MME returns an authentication and ciphering message to the UE. Alternatively, the network equipment itself is able to enquire certain network equipment having the service capability of the UE in some manner, for example, through enquiring a network equipment entity and then informs the ENB. The ENB is instructed to send an RRC initial direct transfer message to the MME, the registration is successful, and then the MME returns an authentication and ciphering message to the UE. If the UE is restricted by the network from being registered to the selected MME, for example, due to an area restriction, although the MME has the function of satisfying the service capability of the UE, the UE is unable to be attached to the node, and the MME still needs to send a reroute command message to the ENB to continue selecting a suitable node or reject the registration of the UE.

In Step 1005, if the MME allows the registration of the UE, the MME interacts with the HSS to perform location information update.

In Step 1006, the network equipment returns a reroute complete message to the ENB.

In Step 1007, the ENB sends a direct transfer message carrying attach accept information to the UE.

In Step 1008, the UE sends an attach complete message to a corresponding MME, and then the subsequent process is continued.

In practical applications, alternatively, the node selection is performed after it is acquired that the network allows the UE to use the service after the authentication of the UE (that is, if the selected node does not have the service, the above node selection is performed again). Otherwise, it is possible that the UE does not subscribe the service yet or the network forbids the UE to use the service. As a result, the selection of a node having the service is a waste of energy and resources.

In the above embodiments, suitable network equipment is selected once the UE starts the attachment or the TAU. If the service required by the UE is not used when the UE is attached to the network equipment, the load of the network equipment having certain special service function is increased with the increasing of UEs having certain service function. However, actually, the number of UEs that really use the service is not greatly increased. Therefore, furthermore, in the above method, the UE is handed over to the suitable network equipment only when the UE uses a special service function. For example, when the UE is attached to certain network equipment, the UE requests an SAE VCC or MBMS service at a certain time point. Then, if the network equipment does not support the service, the network equipment initiates a process similar to the relocation. Then, the UE is handed over to certain network equipment that supports the service capability. Then, a service request of the UE is processed after the UE is successfully handed over.

Figure 11:
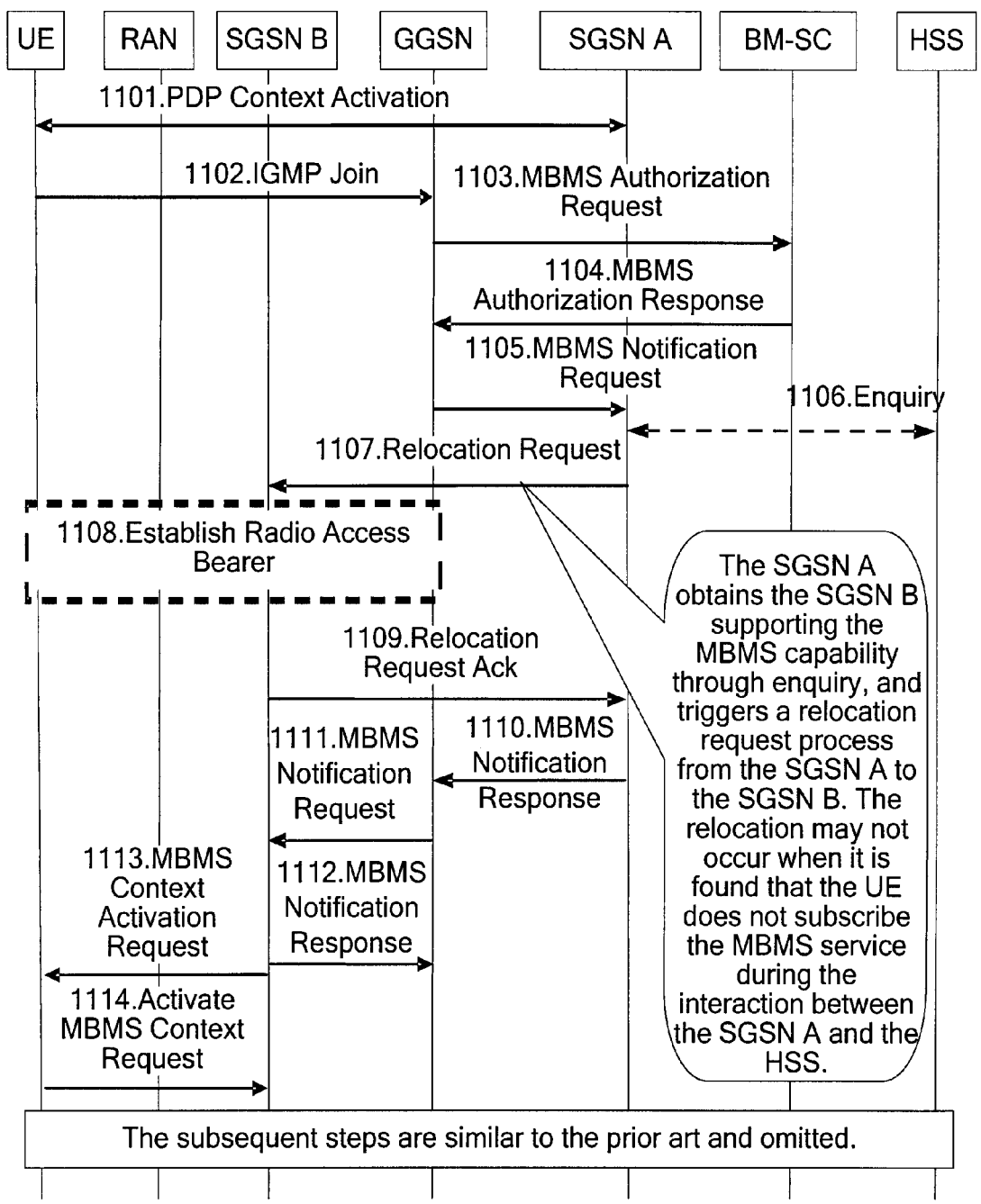
FIG. 11 is a schematic flow chart of another method for selecting network equipments having different capabilities according to an embodiment of the present disclosure.

FIG. 11 is a schematic flow chart of another method for selecting network equipments having different capabilities according to an embodiment of the present disclosure. A MBMS service is taken as an example in this embodiment. Although the flows of other services are different from the flow of the MBMS service, the idea of all the services lies in relocating the equipment when it is found that current equipment does not support a service at the time when the service is about to be used. As shown in FIG. 11, the method includes the following steps.

In Step 1101, PDP context activation is performed between a UE and an SGSN A.

In Step 1102, the UE sends an internet group management protocol (IGMP) join message to a GGSN.

In Step 1103, the GGSN sends an MBMS authorization request message to a broadcast/multicast serving center (BM-SC).

In Step 1104, the BM-SC returns an MBMS authorization response message to the GGSN.

In Step 1105, the GGSN sends an MBMS notification request message to the SGSN A.

In Step 1106, the SGSN A receives the MBMS notification request message. When the SGSN A finds itself having no MBMS capability, it enquires configuration or other entities, for example, enquiring an HSS to obtain an SGSN B supporting the MBMS capability.

In Step 1107, the SGSN A sends a relocation request message to the SGSN B.

In this step, the SGSN A obtains the SGSN B supporting the MBMS capability through enquiry, and triggers a relocation request process from the SGSN A to the SGSN B. The relocation may not occur when it is found that the UE does not subscribe the MBMS service during the interaction between the SGSN A and the HSS.

In Step 1108, the relocation process from the SGSN A to the SGSN B is performed, and a specific relocation flow is omitted.

In Step 1109, the SGSN B returns a relocation request acknowledgement message to the SGSN A.

In Step 1110, the SGSN A sends an MBMS notification response message carrying address information of the SGSN B to the GGSN.

In Step 1111, the GGSN sends an MBMS notification request message to the SGSN B.

In Step 1112, the SGSN B returns an MBMS notification response message to the GGSN.

In Step 1113, the SGSN B sends an MBMS context activation request message to the UE.

In Step 1114, the UE returns an activate MBMS context request message to the SGSN B.

In this step, the UE shifts a mobility management (MM) context, a PDP context, and an MBMS UE Context from the SGSN A to the SGSN B. After such a process is finished, the SGSN A sends an MBMS notification response to inform the GGSN to use the SGSN B to establish an MBMS service.

For different services, the relocation flows are different. However, the node relocation is performed only when the UE needs to use a certain service and the currently attached network node does not support the service. The target node after the relocation may be a node in the original pool or a node selected from a new primary pool.

In practical applications, if pools having different capabilities also exist, the selection of a suitable pool for serving the UE is similar to selecting network equipments having different capabilities, which thus is not described here repeatedly.

In the above embodiments, if the UE enters one new TA that does not belong to a TA list assigned to the UE, the UE needs to initiate a TAU. Moreover, when an ENB accessed by the UE does not have an interface with the original MME or serving SAE gateway or certain abnormal situation occurs, for example, the source MME or serving SAE gateway fails or the load is excessively high, one new MME or serving SAE gateway needs to be selected.

Figure 12:
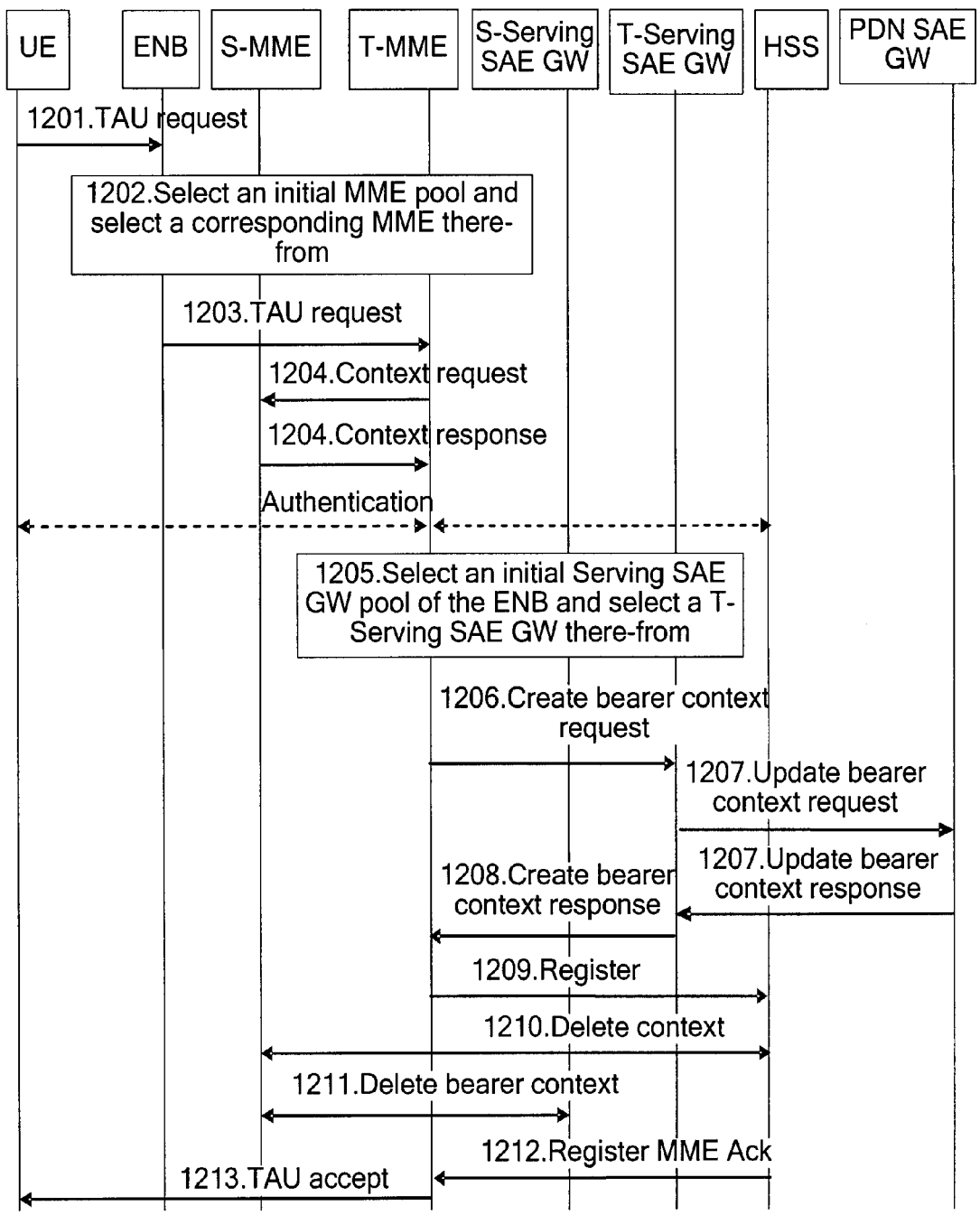
FIG. 12 is a schematic flow chart of a TAU method for selecting network equipment according to an embodiment of the present disclosure.

FIG. 12 is a schematic flow chart of a TAU method for selecting network equipment according to an embodiment of the present disclosure. As shown in FIG. 12, the method includes the following steps.

In Step 1201, a UE enters one TA that is not listed in a TA list of the UE, and sends a TAU request message to an ENB.

In this step, the UE enters a new TA, and the TA is not listed in the assigned TA list. Moreover, the ENB accessed by the UE does not have an interface with the original MME or serving SAE gateway (in this embodiment, the circumstance that the ENB does not have an interface with the source MME or serving SAE gateway is taken as an example for illustration).

In Step 1202, the ENB finds itself having no connection with a source MME (S-MME). A primary MME pool or an MME pool with the highest priority of the ENB is selected, and a corresponding MME is selected there-from.

In Step 1203, the ENB forwards the TAU request message to a selected target MME (T-MME).

In Step 1204, the T-MME sends a context request message to the S-MME. The S-MME returns a context response message to the T-MME. The T-MME updates context information of the UE.

In Step 1205, the T-MME finds that no connection is established between the ENB and a source serving SAE gateway (S-Serving SAE GW). A primary serving SAE gateway pool or a serving SAE gateway pool with the highest priority of the ENB is selected, and a target serving SAE gateway (T-Serving SAE GW) is then selected there-from.

In practical applications, the authorization and authentication processes between the T-MME and an HSS and between the T-MME and the UE may also be performed between Step 1204 and Step 1205.

In Step 1206, the T-MME sends a create bearer context request message to the T-Serving SAE GW.

In Step 1207, the T-Serving SAE GW sends an update bearer context request message to a PDN SAE GW. The PDN SAE GW returns an update bearer context response message.

In this step, the T-Serving SAE GW updates S5/S8 bearers used by all the UEs in the PDN SAE GW.

In Step 1208, the T-Serving SAE GW sends a create bearer context response message to the T-MME.

In Step 1209, the T-MME registers to the HSS.

In Step 1210, the HSS deletes context information of the UE in the S-MME.

In Step 1211, the S-MME deletes bearer context information of the UE in the S-Serving SAE GW.

In Step 1212, the HSS sends a Register MME Ack message to the T-MME.

In Step 1213, the T-MME sends a TAU accept message to the UE.

As described above, when the ENB is only connected to one pool, the selection of a primary pool or a pool with the highest priority is not a real selecting process, but merely a process of selecting the pool to which the ENB is connected.

In addition, based on a principle of a pool, once an MME is selected by the UE during an initial selection process, the UE is unable to replace the MME in the whole moving process within the pool, which may cause that the routing is not sufficiently optimized or the load of a part of the MME is excessively high. The present disclosure further provides the following methods for selecting network equipment.

In Method <1>, when the UE decides to change an NAS node (for example, an MME), if the UE is in an active state, the UE sends an instruction to a network side and accesses the network again; and if the UE is in an idle state, the UE accesses the network, and then subsequent processes are the same as for the above two states of the UE. When the UE accesses the network, the UE carries special information such as indication or cause value in an RRC message. Then, an RAN node (for example, an ENB) selects an NAS node (for example, an MME) again according to the special information.

In Method <2>, when the UE accesses a network, an RAN node (for example, an ENB) decides to change an NAS node (for example, an MME). The RAN node selects an NAS node again, and forwards the NAS information of the UE to the newly selected NAS node. The conditions for triggering the RAN node to change the NAS node may include that the load of the MME is excessively high (for example, an O&M notifies the RAN node of the load information of the NAS node), or the original MME routing of the UE is not sufficiently optimized, and so on.

In Method <3>, after the UE accesses a network, a source NAS node decides to shift the UE to other NAS nodes. The source NAS node may send a UE special instruction to require the UE to access the network again and to select another NAS node. Alternatively, the NAS node sends an instruction to the RAN node, and requires the RAN node to select another NAS node.

The selection of an MME or a serving SAE gateway by an ENB when a UE accesses an SAE network through a EUTRAN has been described above. In practical applications, when the UE accesses through a 2G/3G access system, the ENB is replaced by an SGSN, that is, the SGSN selects a pool and further selects an MME or a serving SAE gateway. When a handing over or abnormal situation occurs in the system, the ENB is replaced by an MME, that is, a source MME selects a pool and further selects an MME or a serving SAE gateway.

As seen from above, in the method, system, and apparatus for selecting network equipment according to embodiments of the present disclosure, a primary pool or a pool with the highest priority is selected according to location information of the UE. Then, specific equipment is selected from the pool according to load balance principles. When equipments having different capabilities exist in a pool, certain equipment having a suitable capability is selected through a EUTRAN, or a CN requires the EUTRAN to select a node again, or node relocation occurs when a service is required. Therefore, the relocation times of an MME and a serving SAE gateway are effectively reduced, and an operation efficiency of the network is enhanced. Furthermore, the UE having or subscribing a new service function selects to be attached to network equipment having the new service function within the pool, so as to meet the diversity demands of service development and save the equipment overhead.

The present disclosure is illustrated in detail through the above preferred embodiments. However, it should be appreciated that the above embodiments are merely some embodiments of the present disclosure, but not intended to limit the scope of the present disclosure. Any modification, equivalent variation, and improvement made without departing from the spirit and principle of the present disclosure fall within the scope of the present disclosure.

What is claimed is:

1. A method for an evolved nodeB (ENB) selecting a core network (CN) equipment for a user equipment (UE), wherein the ENB is connected with multiple pools of CN equipment, the method comprising:
receiving, by the ENB, a first message sent from the UE;
determining, by the ENB, whether the ENB has a connection to a first CN equipment to which the UE registered previously, according to the received first message;
if the ENB has no connection to the first CN equipment to which the UE registered previously:
selecting, by the ENB, a first pool having a lowest probability of CN equipment relocation in the multiple pools; and
selecting, by the ENB, a second CN equipment for the UE from the selected first pool;
if the ENB has the connection to the first CN equipment:
selecting, by the ENB, the first CN equipment for the UE.

2. The method according to the claim 1,
wherein a record indicating a probability of CN equipment relocation of each of the multiple pools is stored in the ENB; and
wherein the selecting, by the ENB, the first pool comprises:
selecting, by the ENB, the first pool having the lowest probability of CN equipment relocation in the multiple pools according to the stored record.

3. The method according to the claim 2, wherein the second CN equipment comprises a Mobility Management Entity (MME) and a serving system architecture evolution (SAE) gateway, and the ENB selecting a second CN equipment for the UE from the selected first pool comprises:
selecting, by the ENB, the MME for the UE from the selected first pool;
obtaining, by the MME, the stored record from the ENB;
selecting, by the MME, the first pool according to the record; and
selecting, by the MME, the serving SAE gateway in the first pool for the UE.

4. The method according to the claim 1, wherein the second CN equipment comprises a Mobility Management Entity (MME) and a serving system architecture evolution (SAE) gateway, and the ENB selecting the second CN equipment for the UE from the selected first pool comprises:
selecting, by the ENB, the MME for the UE from the selected first pool; and
selecting, by the MME, the serving SAE gateway for the UE from the first pool.

5. The method according to the claim 1,
wherein if loads of all CN equipments in the first pool exceed a threshold, a neighboring pool of the first pool is selected and a third CN equipment for the UE is selected from the selected neighboring pool.

6. The method according to the claim 1, further comprising:
obtaining, by the ENB, information of a capability requested by the UE;
wherein the selecting the second CN equipment for the UE from the selected first pool comprises:
selecting the second CN equipment for the UE from the selected first pool according to the information of the capability, wherein the second CN equipment supports the capability.

7. The method according to the claim 1, wherein the selecting the second CN equipment for the UE from the selected first pool comprises:
selecting the second CN equipment for the UE from the selected first pool according to a load balance of CN equipments in the first pool.

8. The method according to the claim 1, further comprising:
obtaining, by the selected second CN equipment, information of a capability requested by the UE;
sending, by the selected second CN equipment, a relocation request, to shift the UE to a CN equipment supporting the capability if the selected second CN equipment does not support the capability.

9. The method according to the claim 1, wherein selecting, by the ENB, the first pool comprises:
selecting, by the ENB, a closest pool to the ENB in the multiple pools as the first pool.

10. The method according to the claim 1, wherein the second CN equipment comprises a Mobility Management Entity (MME) and a serving system architecture evolution (SAE) gateway, and the ENB selecting a second CN equipment for the UE from the selected first pool comprises:
selecting, by the ENB, the MME for the UE from the selected first pool; and
selecting, by the ENB, the serving SAE gateway in the first pool for the UE.

11. An evolved nodeB (ENB), which is connected with multiple pools of core network (CN) equipment, comprising:
a receiver, configured to receive a first message sent from the UE;
a processor, configured to determine whether the ENB has a connection to a first CN equipment to which the UE registered previously, according to the received first message, select a first pool having a lowest probability of CN equipment relocation in the multiple pools if the ENB has no connection to the first CN equipment to which the UE registered previously and select the second CN equipment for the UE from the selected first pool; and select the first CN equipment for the UE if the ENB has the connection to the first CN equipment.

12. The ENB according to the claim 11, further comprising:
an information storing unit, configured to store a record indicating a probability of CN equipment relocation of each of the multiple pools;
wherein the processor is configured to select the first pool having the lowest probability of CN equipment relocation in the multiple pools according to the stored record.

13. The ENB according to the claim 11, further comprising:
a capability information obtaining unit, configured to obtain information of a capability requested by the UE; and
wherein the processor is configured to select the second CN equipment for the UE from the selected first pool according to the information of capability, wherein the second CN equipment supports the capability.

14. The ENB according to the claim 11, wherein the processor is configured to select the second CN equipment for the UE from the selected first pool according to a load balance of CN equipments in the first pool.

15. The ENB according to the claim 11, wherein the processor is configured to select a closest pool to the ENB in the multiple pools as the first pool.

16. A system for selecting a core network (CN) equipment, comprising an evolved nodeB (ENB) and a user equipment (UE), wherein the ENB is connected with multiple pools of CN equipment;

wherein the UE is configured to send a first message to the ENB; and the ENB is configured to receive the first message sent from the UE; determine whether the ENB has a connection to a first CN equipment to which the UE registered previously according to the received first message; if the ENB has no connection to the first CN equipment to which the user equipment registered previously, select a first pool having a lowest probability of CN equipment relocation in the multiple pools and select a second CN equipment for the UE from the selected first pool; and if the ENB has the connection to the first CN equipment, select the first CN equipment for the UE.

* * * * *